Figure 1:
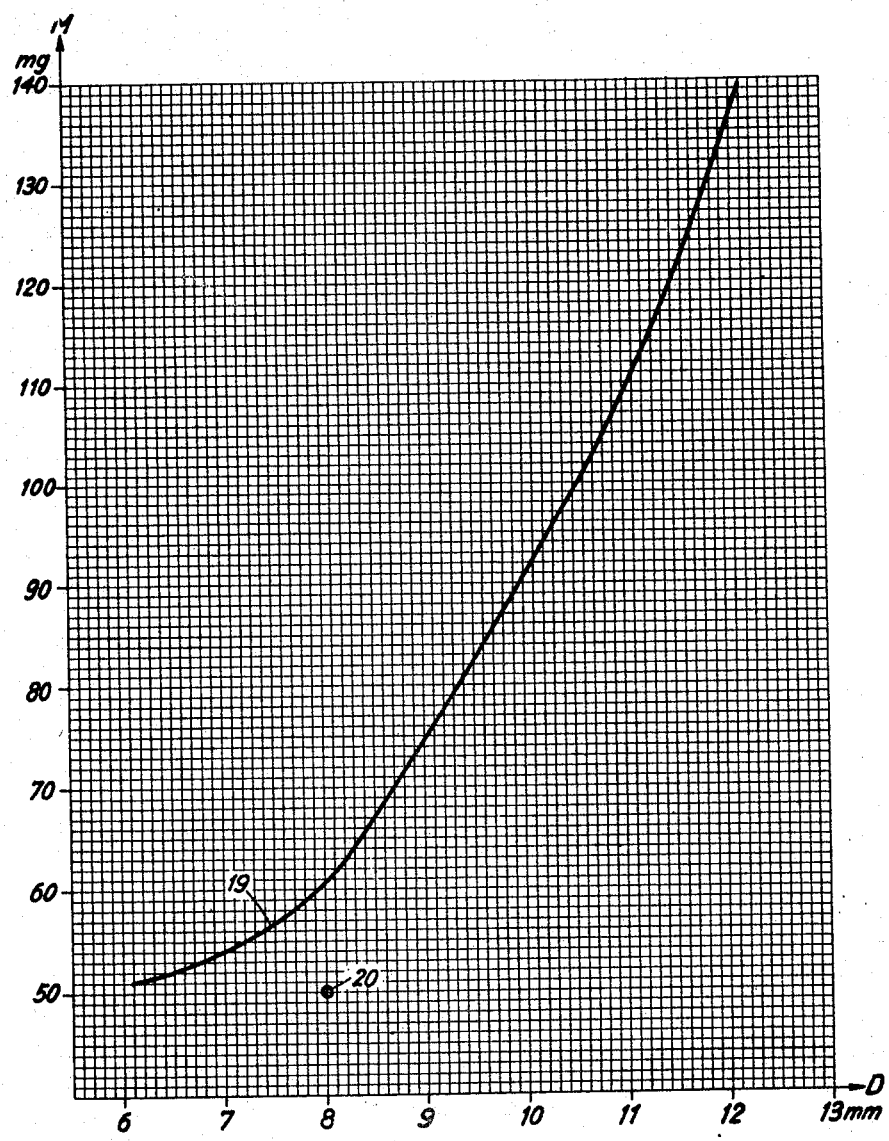

INVENTOR
REINHARD STRAUMANN

United States Patent Office 3,099,128
Patented July 30, 1963

3,099,128
WATCHWORK MECHANISMS
Reinhard Straumann, Waldenburg, Switzerland, assignor to Institut Dr. Ing. Reinhard Straumann A.G., Waldenburg, Switzerland, a Swiss body corporate
Filed Oct. 3, 1960, Ser. No. 60,131
Claims priority, application Switzerland Sept. 10, 1960
8 Claims. (Cl. 58—59)

This invention relates to watchwork mechanisms and has for an object to reduce the liability of the mechanism—and especially the oscillatory system—to damage by shock and lack of lubrication.

The most delicate part of a watch is its oscillatory system. The relatively high speeds which members of the oscillatory system perform necessitate considerable care in the production of the bearings. In order to protect the small pivots and arbors from damage, a variety of shock absorbing devices has been developed. Substantially these rely on an elastic mounting of the jewels which permits them to yield when shocks exceed given limits so that some more robust part of the arbor or component supported thereby can be engaged by a suitably formed abutment surface. Undoubtedly such devices may often prevent fracture or bending of a balance staff or pivot.

The principal disadvantage of all these more or less complex safety devices is that the play of the pivot shank is necessarily small. If oil or particles of dust or contaminates get to the elements of a shock absorbing system, additional friction results which adversely affects the movement of the watch, because the free oscillation of the balance is disturbed. On the other hand, the restricted amount of play of the pivot shank may cause the oil to be squeezed out of the bearings by the relative motion between the bearing elements, allowing the bearings to run dry and to seize.

The present invention is based on the realization that the forces which act on the balance staff are proportional to the mass of the complete balance. Considering this known fact in a watch mechanism according to the present invention the balance has a relatively thick staff but a small total mass. Since the mass of the balance is related to the frequency of its oscillations, the present invention is particularly applicable to watches in which the balance performs between 17,000 and 22,000 half-oscillations per hour. Furthermore, since the mass of the balance also depends upon the size of the watch, it is proposed to make this mass functionally dependent upon the internal diameter of the spring barrel.

In a mechanism such as a wrist watch, according to the present invention, and in which the balance wheel performs between 17,000 and 22,000 half-oscillations per hour, the balance staff is made of an age-hardenable alloy containing a major proportion of either Fe-Ni, Fe-Co, Fe-W, Fe-Ni-Co or Ni-Co, which permits the finished staff to be age-hardened to give a tensile strength exceeding 200 kg./sq. mm, and a Vickers hardness between 600 and 750—preferably between 650 and 700—and the mass of the entire balance does not exceed the limits of maximum mass $M_m$ (measured in milligrams) for given internal diameters D (measured in millimeters) of spring barrel according to the following table:

| D (mm.) | $M_m$ (mg.) | D (mm.) | $M_m$ (mg.) | D (mm.) | $M_m$ (mg.) |
|---|---|---|---|---|---|
| 6.1 | 51.0 | 8.2 | 62.8 | 10.4 | 97.6 |
| 6.4 | 51.7 | 8.55 | 68.0 | 10.7 | 103.0 |
| 6.7 | 52.8 | 8.9 | 73.3 | 11.0 | 109.2 |
| 7.0 | 54.0 | 9.2 | 77.8 | 11.3 | 115.7 |
| 7.3 | 55.5 | 9.5 | 82.5 | 11.6 | 122.7 |
| 7.6 | 57.4 | 9.8 | 87.4 | 11.9 | 130.7 |
| 7.9 | 59.7 | 10.1 | 92.5 | 12.2 | 139.5 |

Figure 2:
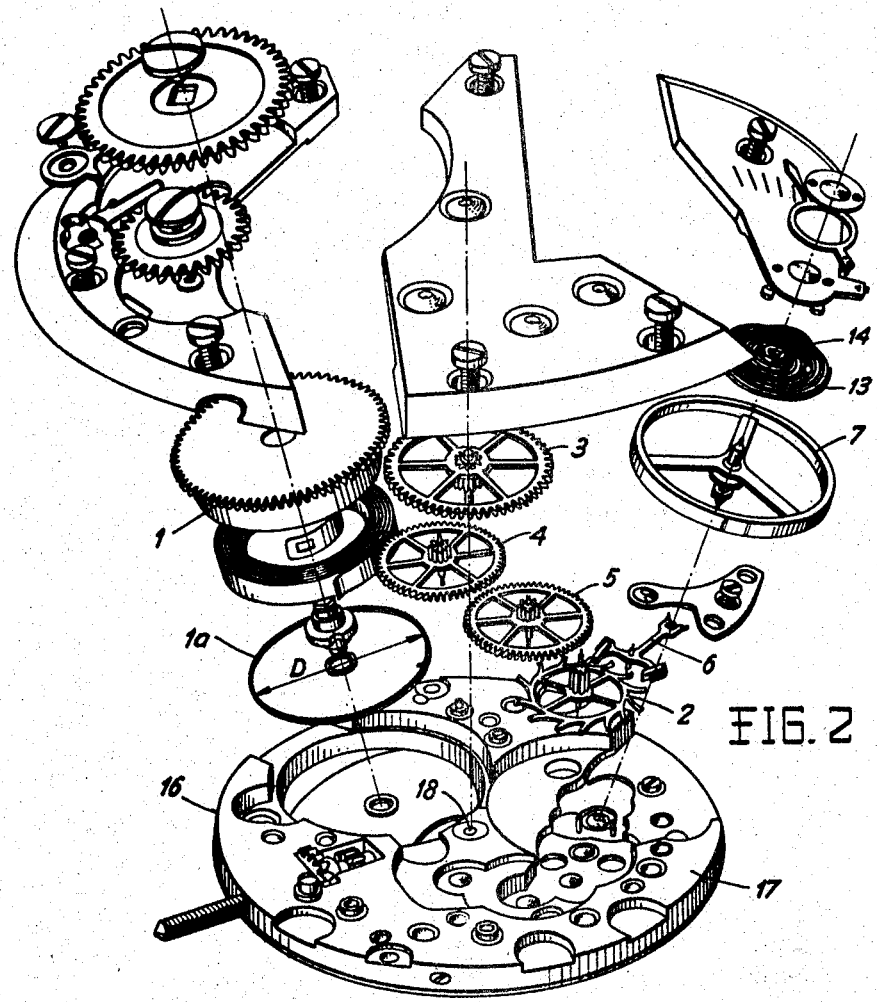
Figure 3:
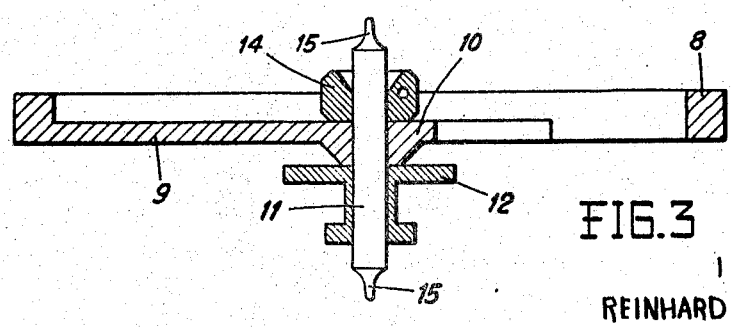

Practical embodiments of the present invention will now be particularly described, by way of example only, with reference to the accompanying drawings in which:

FIGURE 1 is a curve relating limiting values of balance wheel mass to internal diameter of the spring barrel;
FIGURE 2 is an exploded view of a wrist watch, and
FIGURE 3 is an axial section through an entire balance.

The several parts of a watch in which the balance performs between 17,000 and 22,000, and more specifically 18,000 or 19,800 or 21,600 half-oscillations per hour, are clearly shown in FIGURE 2. The spring barrel 1 has a cover 1a and is coupled to the escape wheel 2 by three gear wheels, 3, 4 and 5. Normally the spring barrel 1 will be large enough to fill the whole of the available space between the outer edge 16 of the baseplate 17 and the centre 18. In other words, the overall diameter of the spring barrel will be only slightly smaller than the overall radius of the watch movement. The escapement lever is shown at 6 and the balance as a unit at 7. As will be seen by reference to FIGURE 3, the complete balance comprises a rim 8 which is integral with the spokes 9 and the hub 10 of the wheel. The hub 10 is mounted on a staff 11 which also carries the roller 12 and a collet 14 for attachment thereto of the hairspring 13. The pivots 15 of the staff 11 have a slightly conical taper, the cone angle lying between 3° and 15°, and preferably being approximately 7°. The staff should be as inelastic and as rigid as possible.

It is necessary that the staff consists of an age-hardenable alloy containing a major proportion of either Fe-Ni, Fe-Ni-Co, Ni-Co, Fe-W or Fe-Co, which permits the finished staff to be age-hardened, and that its tensile strength should exceed 200 kg./sq. mm., and its Vickers hardness number should be between 600 and 750, preferably between 650 and 700.

Alloys based on Fe-Ni may have the following compositions:

Type 1:
| | Percent |
|---|---|
| Ni | 50–68 |
| Fe | 10–25 |
| Cr | 12–25 |
| Mo+W | 5–10 |
| Be | 0.6–1.2 |
| Ti | 0.6–2 |
| Si+Mn | 0–3 |

Type 2:
| | |
|---|---|
| Ni | 7–15 |
| Cr | 12–20 |
| Mo | 0–4 |
| W | 0–4 |
| C | 0.05–0.15 |
| Ti | 0–3 |
| Nb | 0–3 |
| Al | 0–1.5 |
| Be | 0–0.8 |
| Mn | 0.1–1.1 |
| Si | 0.1–1.0 |
| Fe | Remainder |

Alloys based on Fe-Ni-Co may comply with one of the following analyses.

Type 3:
| | Percent |
|---|---|
| Ni | 10–63 |
| Co | 5–50 |
| Fe | up to 20 |

The Ni-Co-Fe group constitutes from 57–80% of the total alloy composition.

| | Percent |
|---|---|
| Cr | 10–20 |
| Mo | 5–10 |
| W | 5–10 |

The Cr-Mo-W group constitutes from 20-30% of the total alloy composition;

| | Percent |
|---|---|
| Be | 0.1–3 |
| Ti | 0.1–3 |
| Al | up to 6.5 |
| Nb | up to 5 |
| C | 0.01–0.6 |
| Mn | up to 6 |
| Si | up to 1 |
| V | up to 6 |
| Cu | up to 6 |

The Mn-Si-V-Cu group constitutes up to 8% of the total alloy composition.

Type 4:

| | Percent |
|---|---|
| Ni | 13–65 |
| Co | 18–50 |
| Fe | up to 25 |

The Ni-Co-Fe group constitutes from 52–85% of the total alloy composition.

| | Percent |
|---|---|
| Cr | 10–20 |
| Mo | 1–10 |
| W | up to 10 |

The Cr-Mo-W group constitutes from 11–30% of the total alloy composition.

| | Percent |
|---|---|
| Be | up to 3 |
| Ti | up to 3 |
| C | 0.05–0.6 |
| Al | up to 5 |
| Nb | up to 5 |
| V | up to 6 |
| Cu | up to 6 |

The Be-Ti-C-Al-Nb group constitutes up to 6% of the total alloy composition.

At least one of the elements beryllium, titanium, aluminum and niobium should be present in the following minimum percentages: Be 0.04%; Ti 0.2%; Al 0.1%; Nb 0.1% or a corresponding mixture thereof.

The alloys containing a major amount of Ni-Co may have the following composition:

Type 5:

| | Percent |
|---|---|
| Co | 40–50 |
| Cr | 10–20 |
| Mo | 5 |
| W | 5 |
| Be | 0.2–0.4 |
| Ti | 0.8–1.2 |
| C | 0–0.05 |
| Mn+Si | 2 |
| Ni | 30–40 |

Suitable alloys based on Fe-W may have the following compositions:

Type 6:

| | Percent |
|---|---|
| Co | 20–40 |
| W | 15–25 |
| Cr | 0–20 |
| Mo | 0–6 |
| V | 0–6 |
| C | 0.05–0.2 |
| Si | 0.1–1.0 |
| Mn | 0.1–1.0 |
| Ti | 0–3 |
| Be | 0–0.5 |
| Nb | 0–3 |
| Fe | Remainder |

Alloys based on Fe-Co may be of the following type.

Type 7:

| | Percent |
|---|---|
| Co | 30–45 |
| Mo | 5–15 |
| Cr | 2–10 |
| V | 0–1 |
| C | 0.5–1.5 |
| Si | 0.1–1.0 |
| Mn | 0.1–1.0 |
| Ti | 0–3 |
| Be | 0–0.5 |
| Nb | 0–3 |
| Fe | Remainder |

The balance staff 11 is produced for instance as follows: A wire consisting of one of the alloys of types 1 to 5 is annealed at about 1100° C. and then quenched to room temperature. The resultant wire, which is still soft, is cold worked, by rolling or drawing or both, until its tensile strength exceeds 200 kg./sq. mm. On an automatic lathe a balance staff is now machined out of this wire. When the staff has been machined it is subjected to a thermal treatment which may last between a quarter of an hour and six hours and which involves temperatures between 200° C. and 600° C. This imparts to the staff a Vickers hardness between 650 and 700. Finally, the staff is ground. Alternatively, the staff may be turned after having been thermally treated or it may be ground before being thermally treated.

If an alloy of type 6 or 7 is used, then the initial material must be hot worked at a temperature between 600° C. and 1000° C. and then annealed at an elevated temperature and quenched. From this material the staff may be produced. This is finally submitted for from 10 to 60 minutes to a heat treatment between 400° C. and 700° C. If desired, the staff may be produced after the heat treatment has been performed.

The finished staff is now provided with a light-weight rim, that is to say with a rim which is sufficiently light for the mass M of the entire balance to be less than the mass defined by the limiting curve 19 in FIG. 1. Hence, the mass M of the balance of a watch having a spring barrel 1 with an internal diameter D of 8 mm. may be, for instance, 50 mg., a value which is identified in FIG. 1 by the point 20. A balance of this low weight can be obtained by making the rim from an alloy of low specific gravity, such as an aluminium alloy, or by suitably designing its dimensions, particularly the cross-sections of its spokes and rim. The aim is always to obtain the largest possible moment of inertia for a given weight.

The widely accepted view that watches fitted with a relatively light-weight balance wheel are more likely to suffer from irregular time keeping has been found to be incorrect. On the contrary, it has been ascertained that a watch with a light-weight balance, that is to say a balance weighing less than defined by the limiting curve 19 in FIG. 1, is superior to a watch with a conventional balance wheel, both with respect to its shock resistance and to its time-keeping accuracy.

In wrist watches the friction in the bearings of the balance staff is relatively high. It depends upon the mass of the balance. Friction at the pivot is especially high when the staff is horizontal and lower when the staff is vertical. This friction, which depends upon the attitude of the balance causes the amplitude of the oscillation to vary in dependence upon the position in which the watch is carried. Thereby the time-keeping of the watch will be altered.

A further decrease in amplitude, and hence a further disturbance of the isochronism of the watch, arises as a result of the decrease in torque transmitted by the main spring when it runs down.

These two factors, which additively affect the time-keeping properties of the watch, are both reduced in effect if a balance of light weight is employed. On the one hand, friction depending on mass is less and, on the other, the energy requirements of the oscillating member are reduced. Consequently, the torque delivered by the main spring can be smaller and the spring itself may be thinner.

If the original volume occupied by the spring is retained it is therefore possible to provide a spring of greater length which has the effect of substantially reducing the loss in torque which occurs in the course of 24 hours, that is to say in the course of the development of say, 4 complete convolutions of the spring.

Favourable results are obtained when using main spring requiring 7 to 9 convolutions for complete winding, whereas for watches with balance wheels having a mass above the limiting curve 19 in the graph shown in FIG. 1, the springs nowadays used must often be designed for 5 to 7 convolutions.

It will therefore be readily understood that a shockproof mechanism according to the present invention is of substantially simpler construction than one fitted with conventional shock-absorbing means, and since the lubricating problems associated with the latter are removed and the oscillatory mass is less, the fault liability is reduced.

I claim:

1. In a watchwork mechanism, such as a wrist watch, having a spring barrel and a spring of substantially the maximum energy for the internal diameter of said barrel and a balance including a balance staff mounted in substantially non-resilient bearings and adapted to perform between 17,000 and 22,000 half-oscillations per hour the improvement which comprises that the balance staff consists of an age-hardenable alloy containing a major proportion of a member selected from the group consisting of Fe-Ni, Fe-Co, Fe-W, Fe-Ni-Co and Ni-Co and has a tensile strength exceeding 200 kg./sq. mm. and a Vickers hardness number between 600 and 750, and that the mass of the entire balance does not exceed a maximum value $M_m$ (measured in milligrams) for a given internal barrel diameter D (measured in millimetres) as follows:

| D (mm.) | $M_m$ (mg.) | D (mm.) | $M_m$ (mg.) | D (mm.) | $M_m$ (mg.) |
|---|---|---|---|---|---|
| 6.1 | 51.0 | 8.2 | 62.8 | 10.4 | 97.6 |
| 6.4 | 51.7 | 8.55 | 68.0 | 10.7 | 103.0 |
| 6.7 | 52.8 | 8.9 | 73.3 | 11.0 | 109.2 |
| 7.0 | 54.0 | 9.2 | 77.8 | 11.3 | 115.7 |
| 7.3 | 55.5 | 9.5 | 82.5 | 11.6 | 122.7 |
| 7.6 | 57.4 | 9.8 | 87.4 | 11.9 | 130.7 |
| 7.9 | 59.7 | 10.1 | 92.5 | 12.2 | 139.5 |

2. The improvement according to claim 1 wherein the balance staff consists of an alloy of the following composition:

| | Percent |
|---|---|
| Ni | 10–63 |
| Co | 5–50 |
| Fe | up to 20 |
| Cr | 10–20 |
| Mo | 5–10 |
| W | 5–10 |
| Be | 0.1–3 |
| Ti | 0.1–3 |
| Al | up to 6.5 |
| Nb | up to 5 |
| C | 0.01–0.6 |
| Mn | up to 6 |
| Si | up to 1 |
| V | up to 6 |
| Cu | up to 6 | the sum of said Ni-Co-Fe percentages constituting from 57 to 80%, the sum of said Cr-Mo-W percentages constituting from 20–30%, and the sum of said Mn-Si-V-Cu percentages constituting up to 8% of the total alloy composition.

3. The improvement according to claim 1 wherein the balance staff consists of an alloy of the following composition:

| | Percent |
|---|---|
| Ni | 50–68 |
| Fe | 10–25 |
| Cr | 12–25 |
| Mo+W | 5–10 |
| Be | 0.6–1.2 |
| Ti | 0.6–2 |
| Si+Mn | up to 3 |

4. The improvement according to claim 1 wherein the balance staff consists of an alloy of the following composition:

| | Percent |
|---|---|
| Ni | 7–15 |
| Cr | 12–20 |
| Mo | up to 4 |
| W | up to 4 |
| C | 0.05–0.15 |
| Ti | up to 3 |
| Nb | up to 3 |
| Al | up to 1.5 |
| Be | up to 0.8 |
| Mn | 0.1–1.1 |
| Si | 0.1–1.0 |
| Fe | remainder |

5. The improvement according to claim 1 wherein the balance staff consists of an alloy of the following composition:

| | Percent |
|---|---|
| Ni | 13–65 |
| Co | 18–50 |
| Fe | up to 25 |
| Cr | 10–20 |
| Mo | 1–10 |
| W | up to 10 |
| Be | up to 3 |
| Ti | up to 3 |
| Al | up to 5 |
| Nb | up to 5 |
| C | 0.05%–.6% |
| V | up to 6 |
| Cu | up to 6 | the sum of said Ni-Co-Fe percentages constituting from 52 to 85% and the sum of said Cr-Mo-W constituting from 11 to 30% of the total of the alloy composition and at least one of the metals beryllium, titanium, aluminium and niobium being present.

6. The improvement according to claim 1 wherein the balance staff consists of an alloy of the following composition:

| | Percent |
|---|---|
| Co | 20–40 |
| W | 15–25 |
| Cr | up to 20 |
| Mo | up to 6 |
| V | up to 6 |
| C | 0.05–0.2 |
| Si | 0.1–1.0 |
| Mn | 0.1–1.0 |
| Ti | up to 3 |
| Be | up to 0.5 |
| Nb | up to 3 |
| Fe | Remainder |

7. The improvement according to claim 1 wherein the balance staff consists of an alloy of the following composition:

| | Percent |
|---|---|
| Co | 30–45 |
| Mo | 5–15 |
| Cr | 2–10 |
| V | up to 1 |
| C | 0.5–1.5 |
| Si | 0.1–1.0 |
| Mn | 0.1–1.0 |
| Ti | up to 3 |

| | Percent |
|---|---|
| Be | up to 0.5 |
| Nb | up to 3 |
| Fe | Remainder |

8. In a watchwork mechanism, such as a wrist watch, having a spring barrel with a spring of substantially the maximum energy for the internal diameter of said barrel and a balance including a balance staff mounted in substantially non-resilient bearings and adapted to perform between 17,000 and 22,000 half oscillations per hour, the improvement which comprises that the balance staff consists of a high strength material having a tensile strength exceeding 200 kg./sq. mm. and a Vickers hardness number between 600 and 750, and that the mass of the entire balance does not exceed a maximum value $M_m$, measured in milligrams, for a given internal barrel diameter D, measured in millimeters, as follows:

| D (mm.) | $M_m$ (mg.) | D (mm.) | $M_m$ (mg.) | D (mm.) | $M_m$ (mg.) |
|---|---|---|---|---|---|
| 6.1 | 51.0 | 8.2 | 62.8 | 10.4 | 97.6 |
| 6.4 | 51.7 | 8.55 | 68.0 | 10.7 | 103.0 |
| 6.7 | 52.8 | 8.9 | 73.3 | 11.0 | 109.2 |
| 7.0 | 54.0 | 9.2 | 77.8 | 11.3 | 115.7 |
| 7.3 | 55.5 | 9.5 | 82.5 | 11.6 | 122.7 |
| 7.6 | 57.4 | 9.8 | 87.4 | 11.9 | 130.7 |
| 7.9 | 59.7 | 10.1 | 92.5 | 12.2 | 139.5 |

References Cited in the file of this patent

UNITED STATES PATENTS

| 1,333,161 | Coats et al. | Mar. 9, 1920 |
| 2,496,248 | Jennings | Jan. 31, 1950 |
| 2,622,021 | Demirjian et al. | Dec. 16, 1952 |